Oct. 25, 1955     G. E. KINDIG ET AL     2,721,506
FILM METERING AND DOUBLE EXPOSURE PREVENTION DEVICE
Filed Sept. 24, 1952     2 Sheets-Sheet 1

Guilford E. Kindig
Harvey H. Dudley
INVENTORS

Daniel I. Mayne
BY
J. Griffin Little
ATTORNEYS

Oct. 25, 1955  G. E. KINDIG ET AL  2,721,506
FILM METERING AND DOUBLE EXPOSURE PREVENTION DEVICE
Filed Sept. 24, 1952  2 Sheets-Sheet 2
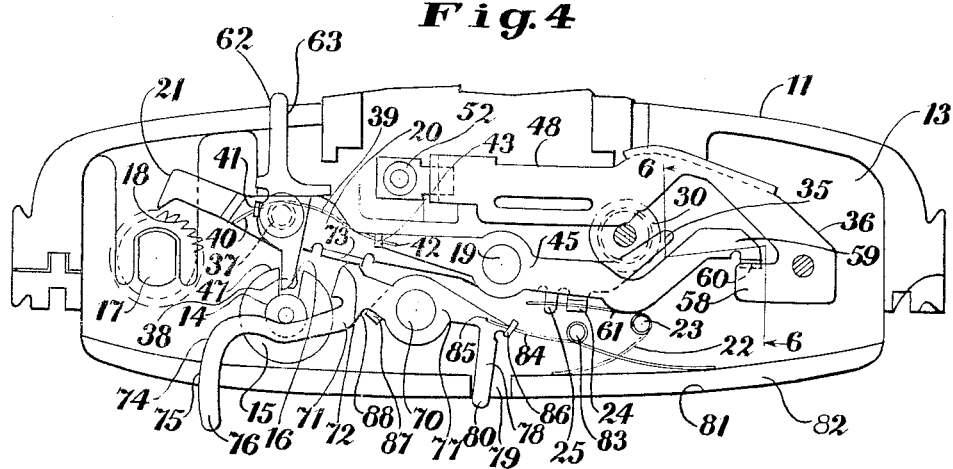
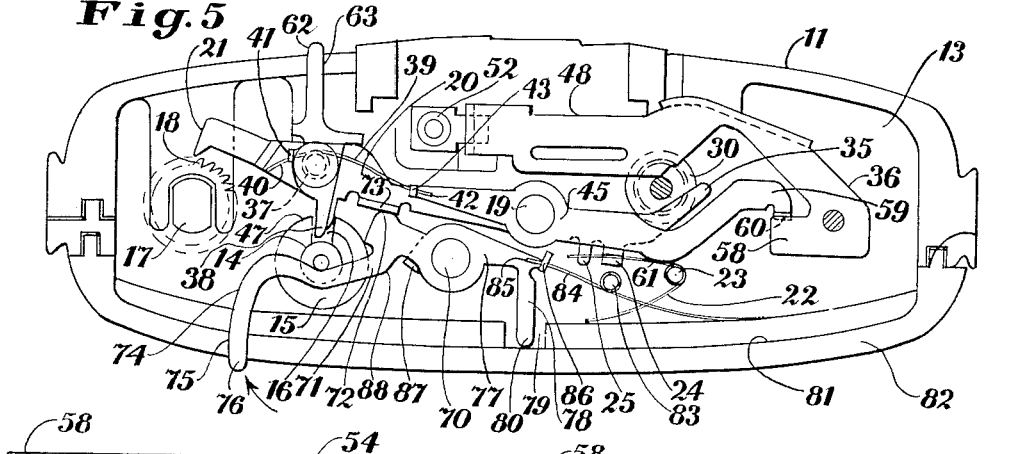
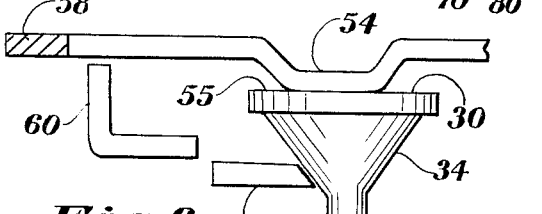
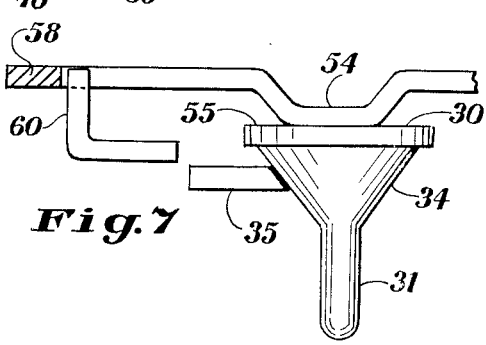
Guilford E. Kindig
Harvey H. Dudley
INVENTORS
BY Daniel I. Mayne
J. Griffin Little
ATTORNEYS United States Patent Office 2,721,506
Patented Oct. 25, 1955

2,721,506

FILM METERING AND DOUBLE EXPOSURE PREVENTION DEVICE

Guilford E. Kindig and Harvey H. Dudley, Rochester, N. Y., assignors to Eastman Kodak Company, Rochester, N. Y., a corporation of New Jersey Application September 24, 1952, Serial No. 311,192

16 Claims. (Cl. 95—31)

The present invention relates to roll film cameras, and more particularly to a double exposure prevention device which may be easily and quickly thrown out of operation to permit the winding of the trailer and leader strips.

It has long been common practice to provide roll film cameras, especially those of the more expensive type, with a device which will prevent the winding of unexposed film areas, and also which will prevent a second actuation of the shutter actuating mechanism until the previously exposed image area has been wound up, so as to prevent the making of an unintentional double exposure. To secure this result, a pivoted interlock or stop pawl lever is usually positioned between the film winding mechanism and the shutter actuating mechanism. This lever is provided with a pawl which cooperates with a notched measuring roll or drop-off disk which constitutes an indexing mechanism and which is operatively connected to and rotatable by the moving film strip. When the roll or disk has been rotated the proper amount, usually one revolution, to move the film the distance of one image area, the pawl cooperates with the notched disk to allow the interlock or stop pawl lever to move into locking relation with the film winding mechanism to lock the latter. Such movement of the stop pawl lever serves to unlock the shutter actuating mechanism. Operation of the latter then serves to rock the stop pawl lever to unlock the winding mechanism and simultaneously to lock the shutter actuating mechanism. Thus, the interlock serves to lock the mechanisms alternately and normally would prevent a second actuation of the locking mechanism until the other mechanism has been again operated.

While this interlocking is satisfactory during normal winding of the successive film areas, means must be provided to render the interlock ineffective for locking the winding mechanism to permit free and unobstructed rotation of the winding mechanism to wind up the trailer and leader strips, as is deemed apparent. To this end, the present invention provides a new and improved arrangement for moving the interlock from an inoperative position to release the winding mechanism after the last exposure has been made to permit winding up of the trailer strip. Also, the interlock is rendered inoperative during the winding of the leader strip until the first image area is brought into position, at which time the interlock is again brought into operative position to lock the winding mechanism.

The invention has as its principal object the provision of a new and improved throw-out mechanism for the stop pawl lever to unlock the winding mechanism to permit the unobstructed winding of the trailer and leader strips.

Yet another object of the invention is the provision of such a throw-out mechanism which operates automatically when the camera back is opened.

Yet another object of the invention is the provision of a throw-out mechanism which comprises releasable members, one of which may be moved relative to the other when the back is closed to permit the end of the lever strip to be wound completely to bring the first image area into operative position.

To these and other ends, the inventive idea resides in certain improvements and combinations of parts, all as will be hereinafter more fully described, and the novel features being pointed out in the claims at the end of the specification.

In the drawings:

Fig. 4 is a view similar to Fig. 1 but with the back open or removed showing the relation of the throw-out mechanism to shift the interlock to position to release the film winding mechanism to permit unobstructed operation thereof to wind up the trailer strip as well as the initial portion of the leader strip;

Fig. 5 is a view similar to Fig. 4 but with the cover in place, showing the relation of the throw-out parts to permit the final winding of the leader strip;

Fig. 6 is a partial sectional view taken substantially on line 6—6, of Fig. 4, showing the relation of the shutter locking mechanism just before the shutter trigger is operated;

Fig. 7 is a view similar to Fig. 6 but showing the relation of the parts at an intermediate point in the shutter trigger actuation; and Fig. 8 is a view similar to Figs. 6 and 7, but showing the relation of the parts at the end of the shutter trigger operation to lock the latter against a second actuation.

Similar reference numerals throughout the various views indicate the same parts.

Figure 1:
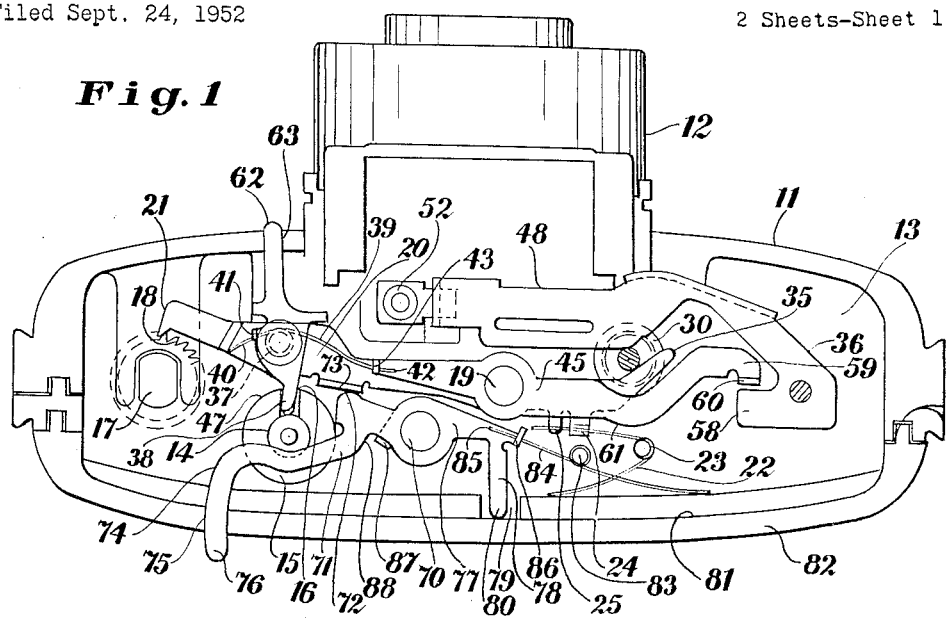
Fig. 1 is a plan view of a roll film camera, with the top cover plate removed, showing the relation of the double exposure prevention device and the throw-out mechanism constructed in accordance with the preferred embodiment of the invention, the parts being in the position occupied at the end of the film winding operation.

Fig. 1 shows a roll film camera having a body portion 11 from the front of which projects a lens tube 12 which carries the lens and diaphragm mechanisms, not shown. As this latter structure forms no part of the present invention, details thereof are not illustrated or described. The body portion 11 is provided with a mechanism plate 13 which divides the interior of the camera into two compartments, one of which, not shown, contains a film spool and a film strip, and the other, not designated, carries the various control mechanisms to be later described. The plate 13 has projecting therefrom a shaft 14 on which is mounted a drop-off disk 15 formed with a radially extending notch 16. The disk 15 is connected to shaft 14 through a slip clutch of any suitable design, so that the disk may remain stationary as the shaft 14 is rotated in the winding of the leader and trailer strips to hold the disk stationary to maintain the phased relation of the interlocking mechanism. The other end of the shaft 14 extends into the film chamber so that the shaft, or members carried thereby, engages and is driven by the moving film so the disk 15 will rotate in timed relation to the moving film. As the connection of shaft 14 with the film may be of any standard or well known construction and forms no part of the present invention, further details are not deemed necessary. Suffice it to say, the disk 15 is so designed that it will make exactly one complete revolution when the film strip has been moved the distance of one image area. The film is moved by rotating the take-up shaft 17 by a suitable knob or lever, not shown. The shaft 17 is connected in the usual manner to the take-up spool so that upon rotation of the shaft the film will be wound and the disk 15 will be rotated. The shaft 17 has connected thereto a ratchet 18.

The plate 13 has pivoted at 19 thereon a stop pawl lever 20 one end of which is provided with a stop pawl 21 which is adapted to be moved into engaging relation with ratchet 18 at the end of the film winding operation to prevent further rotation of shaft 17 and hence movement of the film strip. A hairpin spring 22 is wrapped around pin 23 on plate 13, and has one end in engagement with a lug or ear 24 on lever 20, and tends to rock the latter in counter clockwise direction about pivot 19. A second lug 25 on lever 20 cooperates with lug 24 to hold the spring 21 in proper vertical relation with the lever 20. The other end of spring 20 engages the camera body to tension the spring, as clearly shown in Figs. 1, 2, 4 and 5. The other end of plate 13 has extending therethrough a shutter body or released button 30 having a lower portion 31 which projects below the plate 13 and into engagement with a plate 32 which is rockable about the shaft 33 connected to the shutter tripping mechanism. As the latter may be of any suitable or well known design, and forms no part of the present invention, details thereof are not illustrated or described. The arrangement is such that upon pressing down the button 30, the plate 32 is rocked clockwise, as viewed in Fig. 3, to rock shaft 33 to trip or actuate the shutter to make the exposure. The intermediate portion of button 30, above plate 13, is formed with a cone 34 with which a finger 35, on the right end of lever 20, cooperates. The result is that when the button 30 is depressed to make an exposure, the cone 34 will engage finger 35 to impart a clockwise rotation to the stop pawl lever 20 about its pivot 19, to move the stop pawl 21 from its holding relation with the ratchet 18, as is deemed apparent from an inspection of Fig. 2.

The stop pawl lever 20 is formed with a depending metering pawl 36 connected to lever 20 at 37. It will now be apparent that when the film strip has been moved the distance of one image area, the drop-off disk 15 will have been rotated one revolution to bring notch 16 thereof into registry with the metering pawl 36. Thereupon, the lever 20 is rocked counter-clockwise about its pivot by the action of spring 22. This rotation serves to move pawl 36 into notch 16 to permit pawl 21 to move in locking relation with the ratchet 18 to arrest further movement of the take-up roll, and hence the film strip. The disk 15 and the associated parts therefor, constitute an indexing mechanism which controls the time of locking of the film winding mechanism. With this arrangement the winding mechanism is effectively and automatically locked after the film strip has been moved exactly the distance of one image area. Simultaneously with the locking of the film winding mechanism, the shutter actuating mechanism is released, as will be later described. After the film winding mechanism has been locked and the shutter released, the button 30 may be depressed to make an exposure. The downward movement of the button will engage finger 35 to rock the lever 20 to release the film winding mechanism. Thus, actuation of the shutter serves to unlock the film winding mechanism. At the completion of the shutter actuation, the shutter actuating mechanism is then locked in a manner to be later pointed out.

It will now be apparent that after the lever 20 has been rocked clockwise to withdraw stop pawl 21 out of holding relation with ratchet 18, the release of button 30 would permit lever 20 to rock back counter clockwise, under the action of spring 22 again, to move pawl 36 back into slot 16 and pawl 21 into locking relation with ratchet 18 to lock the winding mechanism, the disadvantages of which are deemed apparent. In order to overcome this difficulty, means is preferably provided for holding lever 20 in such a position as to prevent pawl 36 from again entering notch 16 after the shutter button 30 is released.

Figure 2:
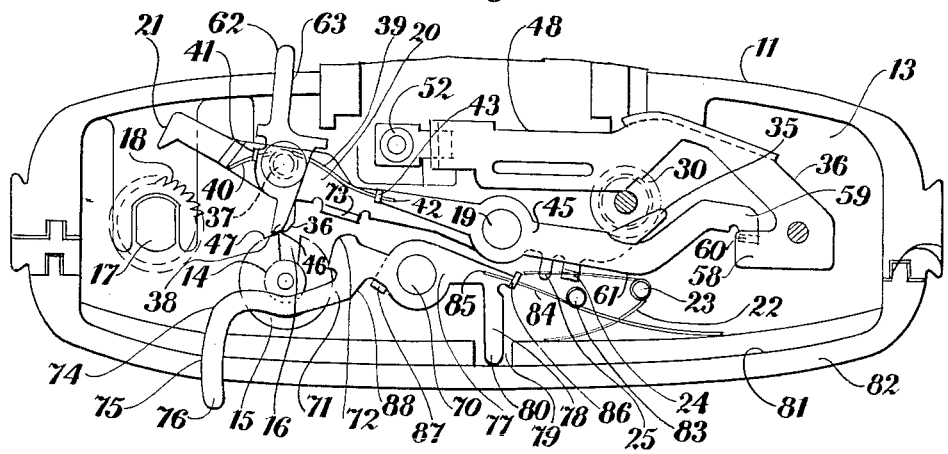
Fig. 2 is a view similar to Fig. 1 but showing the relation of the parts after actuation of the shutter trigger or operating mechanism.
Figure 3:
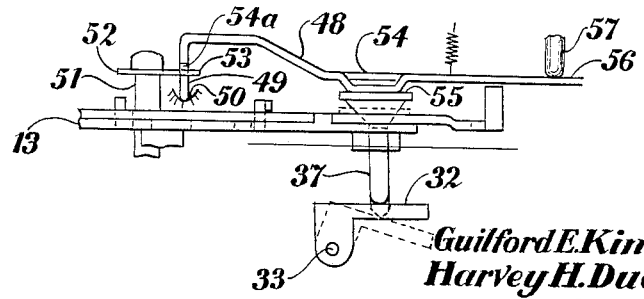
Fig. 3 is a side elevation view of the mechanisms illustrated in Figs. 1 and 2, showing the connection between the shutter trigger and the shutter tripping mechanism.

To this end, the lever 20 has rockably mounted thereon at 37, a secondary or holding pawl 38 which overlies the metering pawl 36 and which is also adapted to register with pawl 36 and moves as a unit therewith into notch 16. A spring 39 has one end 40 held under an ear 41 formed on pawl 38, and has the other end 42 anchored under an ear 43 formed on the left end of a double arm lever 45, to be later described, pivoted at 19 for movement relative to lever 20. The spring 39 tends to rock the secondary pawl 38 clockwise relative to the metering pawl 36. Now, when the button 30 is depressed a clockwise rotation is imparted to lever 20 to withdraw both pawls 36 and 38 out of notch 16 and to move pawl 21 out of holding relation with ratchet 18. However, when the end of the secondary pawl 38 clears the notch 16, it will be rocked clockwise, by spring 39, relative to and out of registry with pawl 36, and notch 16, as illustrated in Fig. 2. Now, when the button 30 is released, the free end 46 of pawl 38 will engage and rest on the periphery 47 of the disk 15 adjacent the notch 16, and will prevent re-entry of either pawl 36 or 38 into the notch 16 so as to retain the pawl 21 out of locking relation with ratchet 18, as clearly illustrated in Fig. 2.

Thus, after the shutter is actuated, the winding mechanism is unlocked and held unlocked so that the exposed image area may be wound up. The shutter or body release button 30 may be operated directly to trip the shutter. However, for certain design reasons it is desirable, in the present instance, to operate button 30 indirectly. To this end, a lever or arm 48, of a shape best shown in Figs. 1–3, has one end 49 mounted in the depression 50 formed in the plate 13, and the camera body to provide a pivot for the arm or lever 48. The plate 13 also has extending upwardly therefrom a post 51 which carries a short, flat cantilever spring 52 the free end of 53 of which extends through a slot 54a ind the end 49 of lever 48 to hold the end of 49 in the depression 50, which forms a pivotal point for the lever 48. An intermediate portion 54 of arm 48 overlies and is adapted to engage the top surface 55 of the cone 34 to move the latter downward to operate the shutter, as is deemed apparent from Figs. 3, 6, 7 and 8. The right end 56 of the arm 48 is adapted to be engaged by the button 57 slidably mounted in the top plate of the camera body to move arm 48 downward about pivot 50 to actuate the button 30 and the shutter. The end 56 is formed with a laterally extending ear or projection 58.

As mentioned above, the two-arm lever 45 is pivoted at 19 on the pivotal point of the stop pawl lever 20 for movement relative thereto. The right end 59 of arm 45 is formed with an upturned ear or lug 60. As also mentioned above, the end 42 of spring 39 engages an ear 43 formed on the left end of the arm 45. This spring 39 tends to rock arm 45 in a clockwise direction about pivot 19 to move ear 60 under projection 58 to prevent a second actuation of the arm 48, and hence the shutter, as is deemed apparent from an inspection of Figs. 2 and 8. In order to prevent such movement of the arm 45 prior to actuation of the shutter, the lug 24 on stop pawl lever 20, which is engaged by spring 22, projects up and into the path of the lower edge 61 of the right end 59 of the arm 45 to the right of pivot 19 as shown in the drawings. With this arrangement, when the lever 20 is rocked counter-clockwise, by the action of spring 20, to drop pawls 36 and 38 into notch 16, the ear 24 on the lever 20 will engage edge 61 on the right end of arm 45 to rock the latter counter-clockwise about pawl 19 to move the arm 45 from the position illustrated in Fig. 2 to that illustrated in Fig. 1 to shift ear 60 out from under ear 58 to free arm 48, and hence the shutter actuating mechanism. Thus, when the film winding mechanism is locked, the shutter actuation mechanisms is released. However, when the right end of lever 48 is depressed to make an exposure, the cone 34 is also moved downwardly therewith so as to engage finger 35 to rock lever 20 clockwise to draw pawls 36 and 38 out of notch 16 and simultaneously move pawl 21 out of holding relation with the ratchet 18 to free the winding mechanism. Thus, operation of the shutter unlocks the film winding mechanism. However, when the lever 20 rocks clockwise, the ear 24 moves out of holding engagement with the edge 61 to free lever 45. The latter, however, cannot rock clockwise any appreciable amount, under the action of spring 39, because when the button 30 is moved downwardly, the ear 58 also moves downward therewith and into the path of ear 60, as shown in Fig. 7. However, when the shutter is released, the spring 52 serves to return arm 48 and ear 58 to their upper position and to shift ear 58 vertically out of the path of ear 60, as shown in Figs. 6 and 8. The arm 45 is now free and may rock clockwise, under the action of spring 39, to shift ear 60 under ear 58 to prevent a second actuation of arm 48 and, hence, the shutter, as clearly illustrated in Figs. 2 and 8. Thus, the tripping of the shutter locks the latter automatically against second actuation, and simultaneously unlocks the film winding mechanism.

Thus, the stop pawl lever 20 and associated parts may be designated broadly as interlock between the film winding mechanism and the shutter actuating mechanism to lock the mechanisms alternately so that the locking mechanism cannot be actuated a second time until the other or unlocked mechanism is first actuated. While the above-described mechanisms will prevent the inadvertent winding of an unexposed image area or the making of an unintentional double exposure, it is sometimes desirable to make an intentional or deliberate double exposure. When the pawl 20 is rocked when making an exposure, the film winding mechanism is released and the pawls 36 and 38 are withdrawn from notch 16. Upon such withdrawal, pawl 38 rocks relative to pawl 36 and rests on the periphery 47 of disk 15. The parts are then in the position shown in Fig. 2. It is apparent from an inspection of this figure, that if pawl 38 is rocked counterclockwise about pivot 37 and relative to pawl 36, the two pawls will again be brought into registration, and the spring 22 may then serve to rock the lever 20 in a counterclockwise relation to move pawls 36 and 38 into notch 16 and to bring pawl 21 into locking relation with ratchet 18. Thus, merely by rocking pawl 38 counterclockwise, about pivot 37, the film winding mechanism may again be locked and the shutter actuating mechanism released. It is to be noted that this locking relation has been obtained without the operation of the shutter so that after one exposure is made the film winding mechanism may again be locked to release the shutter actuating mechanism so the latter may again be operated to make a deliberate double exposure. Any suitable means may be provided for imparting the counterclockwise movement to pawl 38. In the present instance, the pawl 38 is formed with an extending finger 62 which projects through an opening 63 in the camera housing or body. Thus, by merely engaging finger 62, the pawl 38 may be rocked counterclockwise to free the lever 20 so that the latter may rock, locking the film winding mechanism and unlocking the shutter actuating mechanism, so that the already exposed film area may again be exposed to provide the intentional double exposure.

With the above-described mechanisms, each time the film strip has been moved the distance of one image area, the film is locked automatically. As is the usual practice, roll films are provided with protective opaque paper strips which project beyond the ends of the film to provide protective light-tight wrappers therefor. These protective strips have a length equal to many times the length of an image area. In order to wind up such paper strips, means must be provided for rendering the locking of the winding mechanism inoperative to permit the free and unobstructed winding of those strips which are usually termed "trailer" and "leader" strips. To this end, the present invention provides a new, simple and effective means for rendering the film locking means ineffective so as to provide free and unobstructed winding of the "trailer" and "leader" strips.

To secure this result, the plate 13 has pivoted at 70, a lever 71 formed with an ear 72 positioned adjacent an upturned lug 73 on the stop pawl lever 20. Normally a slight clearance is provided between ear 72 and lug 73. After the last exposure has been made it is necessary to wind up the trailer strip so as to provide the necessary protective layers to protect the exposed film strips against light. It will be apparent, however, that as soon as the film and trailer have been advanced the distance of one image area, the lever 20 will be rocked to move the pawl 21 into locking relation with ratchet 18 to prevent further winding of the trailer strip. Such an arrangement is highly undesirable as at this time the winding mechanism should be free so as to permit undisturbed winding of the "trailer" strip. To insure this result, means is provided for imparting a clockwise rotation to lever 71 to move the lug 72 into engagement with the ear 73 to rock lever 20, against the action of spring 22, to move stop pawl 21 out of holding relation with ratchet 18 to free the wind up mechanism. To this end, lever 71 is formed with a curved arm portion 74 which extends through an opening 75 in the camera body and terminates in a finger actuating portion 76. It will now be apparent that if the portion 76 is pressed inward, lever 71 will rock clockwise about pivot 70 to move the lug 72 thereon into engagement with ear 73 to rock lever 20 clockwise to move the pawl 21 out of holding relation with ratchet 18. Thus, when the trailer strip is to be wound, all the operator needs to do is press in on portion 76 and then operate the winding knob or lever to wind up the last exposed image area and the protective paper trailing strip. It is to be noted that this unlocking of the lever 20 is secured independently of the shutter actuating mechanism.

During the winding of the trailer strip, as well as that of the leader strip, it is desirable to retain the disk 15 stationary so as to maintain the phased relation of the parts of the indexing mechanism which comprises the disk 15 and the two pawls 36 and 38. If this phased relation is not maintained, it may be found that when a new roll of film is placed in the camera, the locking of the mechanisms may not be in proper relation to the position of the film strip. Therefore, it is highly desirable not to disturb the phased relation of the indexing means during the winding of either the "trailer" or "leader" strips. From the above description it will be apparent that this phased relation of the indexing means will be assured and maintained so long as the pawls 36 and 38 are in proper relation with the notch 16 of disk 15. It is also apparent that after the last exposure is made, and the film moved, the disk one image area, the indexing mechanism is in proper relation and tends to lock the film winding mechanism. However, in order to prevent such locking at this point, the pivoted lever 70 is pivoted for holding the pawl 21 out of engagement with ratchet 18. To insure the maintenance of the above phased relation of the indexing means, it is essential that the pawls 36 and 38 not be withdrawn from the notch 16 when the lever 71 is actuated to move the lever 20 to disengage pawl 21 from ratchet 18, to permit winding of the "trailer" and "leader" strips.

In order to prevent such withdrawal of the pawls 36 and 38 during these winding operations, means is provided for limiting the rocking movement of the lever 71 so the latter will be moved just far enough to rock lever 20 sufficiently to disengage pawl 21 from ratchet 18 but not far enough to withdraw pawls 36 and 38 out of notch 16. To secure this result, the shaft 14 of the disk 15 extends up above the disk and in the path of the lever 71. Now, when the latter is rocked, as above described, the lug 72 thereon will engage lug 73 to rock lever 20 clockwise just sufficiently to disengage pawl 21 from ratchet 18. At that time, lever 71 will then come into contact with the shaft 14 to limit further rocking movement of the lever 71. However, upon such engagement, lever 20 has not been moved far enough to withdraw either of the pawls 36 and 38 out of notch 16 and the phased relation of the indexing mechanism is maintained. As disk 15 is connected to shaft 14 by a slip clutch, the disk remains stationary during the winding of the "trailer" and "leader" strips.

After the "trailer" strip is completely wound, the camera back is opened or removed to permit removal of the completely wound exposed film roll. A new roll of film is then placed in the camera and the leader strip is partially wound on the top roll. During this initial winding of the leader strip, the camera is usually held in one hand while the winding knob is operated with the other hand. Due to the relation of the winding knob and the portion 76, it is difficult to actuate the latter to hold pawl 21 out of engagement with ratchet 18 during this initial winding of the trailer strip. For this reason the present invention provides an auxiliary member which automatically engages and rocks lever 71 into engagement with lever 20 to hold the pawl 21 in an inoperative position when the camera back is removed or opened.

To secure this result, a second lever 77 is pivoted at 70, the pivot point of lever 71. This second lever is formed with a normally arranged portion 78 which extends through an aperture 79 in the camera body, and has an end 80 which is engaged by the inner surface 81 of the camera back 82, when the latter is in closed position, as illustrated in Figs. 1, 2 and 5. In order to hold and maintain end 80 in positive engagement with surface 81, the plate 13 is provided with an upstanding pin 83 about which is wrapped a spring 84 one end 85 of which engages a lug 86 on lever 77 and tends to rock the latter clockwise about pivot 70. Thus, so long as the back 82 is in position lever 77 is inoperative. However, when the back is open, as during the initial threading and winding of the "leader" strip, the surface 81 of the back 82 is moved to a non-holding relation with the end 80 to free lever 77. The latter is now rocked clockwise under the action of spring 84 to the position illustrated in Fig. 4. Such rocking of lever 77 serves to bring a lug or ear 87 thereon into engagement with the surface or edge 88 of lever 71. Such engagement will rock the lever 71 clockwise about its pivot 70 to move lever 71 in the same manner as though lever 71 had been rocked by actuation of the finger portion 76. It is to be noted that this movement of the lever 71 has been obtained without the necessity of the operator actually engaging the finger portion 76. The result is that the operator's hands are free for holding the camera and for winding the initial section of the trailer strip. Here again, when the lever 71 is rocked by lever 77, the shaft 14 serves to limit the movement of the lever 71 to prevent withdrawal of pawls 36 and 38 to insure the maintenance of the phased relation of the indexing mechanism.

After the initial winding of the trailer strip, the camera back is closed. Such closing again brings the surface 81 of back 82 into engagement with the end 80 of portion 79 to rock lever 77 in a counterclockwise direction about pivot 70 to shift lug 87 out of engaging relation with surface 88 to free lever 71. Upon freeing lever 71, the hairpin spring 22 then automatically becomes effective to rock lever 20 in a counterclockwise direction to lock the film winding mechanism. At this time, however, the leader strip has not been completely wound. In order to permit complete winding of the leader strip, it is now necessary for the operator to press in finger portion 76 again to move the lever 20 to an inoperative position to unlock the winding mechanism. The latter is then rotated until the numeral "1" on the backing paper appears in the window in the back of the camera. At this time the finger portion 76 is then released and the parts returned to their normal position, locking the film winding mechanism. The hairpin spring 22 in moving the lever 20 to its locked position also serves to return the lever 71 to its inoperative position, as illustrated in Fig. 1. Thus, during the winding of the "trailer" and "leader" strips, the film winding mechanism is free and unobstructed, yet the indexing mechanism is held in its phased relation so that when a new film is brought into position in the camera, the interlock is in proper relation so as alternately to lock the film and shutter actuating mechanisms.

In the unlikely event that the operator has either intentionally or accidentally shifted the lever 20 far enough to withdraw pawls 36 and 38 out of notch 16, the phased relation of the parts will be restored before the numeral "1" appears in the window of the camera back. This is due to the fact that the leader strip always has a length which is much longer than that of the image area. Therefore, even if the pawls 36 and 38 are intentionally or accidentally withdrawn from notch 16 when the trailer strip is being wound, the disk 15 will be rotated, and when the notch 16 registers with the pawls 36 and 38, the latter will enter the notch. This operation will occur before the number "1" appears in the window so that before this point is reached, the indexing means will be properly and automatically phased.

Thus, the present invention provides an arrangement by which the interlock may be either manually or automatically moved to an inoperative position to permit free and unobstructed winding of the "trailer" and "leader" strips. This throw-out mechanism is simple in design, easy to operate, and highly effective in its results.

While one embodiment of the invention has been disclosed, it is to be understood the inventive idea may be carried out in a number of ways. Therefore, the present application is not to be limited to the precise details described, but is intended to cover all variations and modifications which fall within the scope of the appended claims.

What we claim and desire to secure by Letters Patent of the United States is:

1. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism connectable to said interlock to control the locking of said winding mechanism thereby, of a member movably mounted on said body and movable into engagement with said interlock to shift the latter out of locking relation with said winding mechanism but without disconnecting said interlock from said indexing mechanism to maintain the phased relation of the latter, and means for moving said member.

2. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism connectable to said interlock to control the locking of said winding mechanism thereby, of a member movably mounted on said body and movable into engagement with said interlock to shift the latter out of locking relation with said winding mechanism but without disconnecting said interlock from said indexing mechanism to maintain the phased relation of the latter, means for moving said member, and means for limiting the movement of said lever to prevent the disconnection of said interlock from said indexing mechanism to maintain the phased relation of the latter.

3. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism connectable to said interlock to control the locking of said winding mechanism thereby, of a member movably mounted on said body and movable into engagement with said interlock to shift the latter out of locking relation with said winding mechanism but without disconnecting said interlock from said indexing mechanism to maintain the phased relation of the latter, means for moving said member, means on said indexing mechanism positioned in the path of said member to limit the movement thereof to prevent the disconnection of said interlock from said indexing mechanism to maintain the phase relation of the latter.

4. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, a drop-off disk connected to the film and rotated in timed relation with the winding thereof, said disk being formed with a radial notch, a pawl carried by said interlock adapted to move into said notch at the end of a film winding operation to permit said interlock to engage said winding mechanism to lock the latter, of a member movably mounted on said body and movable into engagement with said interlock to shift the latter out of locking relation with said film winding mechanism to free the latter, means to actuate said member, and means to limit the movement of said member to prevent the withdrawal of said pawl from said notch while said interlock is shifted to disconnect the latter from said winding mechanism.

5. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, a drop-off disk connected to the film and rotated in timed relation with the winding thereof, said disk being formed with a radial notch, a pawl carried by said interlock adapted to move into said notch at the end of a film winding operation to permit said interlock to engage said winding mechanism to lock the latter, of a member movably mounted on said body and movable into engagement with said interlock to shift the latter out of locking relation with said film winding mechanism to free the latter, means to actuate said member, and means associated with said disk and positioned in the path of said member to limit the movement of the latter to prevent the withdrawal of said pawl from said notch when said interlock is shifted by said member to unlock said winding mechanism.

6. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, of a camera back associated with said body and movable relative to said body to and from closed position, means including a pivoted lever on said body formed with a portion offset radially from the pivot of said lever and adapted to be engaged by said back when the latter is in closed position to retain said lever in one position, the opening of said back serving to move the back out of engagement with said portion to free said lever which now rocks about said pivot to move said lever to another position, and means engaged by said lever when in said other position and moved into engagement with said interlock to shift the latter out of locking relation with said winding mechanism independently of said shutter actuating mechanism.

7. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, of a camera back associated with said body and movable relative to said body to and from closed position, a lever pivoted on said body, a portion of said lever positioned in the path of said lever and adapted to be engaged by said back when the latter is in body closing position to move said lever to one position, said back being movable out of engagement with said portion when said back is moved to open position to free said lever, means to shift said freed lever to another position, and separate means actuated by said freed lever when in said other position for engaging and shifting said interlock out of locking relation with said winding mechanism independently of said shutter actuating mechanism.

8. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, of a camera back associated with said body and movable relative to said body to and from closed position, a lever pivoted on said body, a portion of said lever offset radially from the pivot of said lever and positioned in the path of and adapted to be engaged by said back when the latter is in body closing position to move said lever to one position, said back being movable out of engagement with said portion when said back is moved to open position to free said lever, means to shift said freed lever to another position, a second lever pivoted on said body, a section on said second lever movable into engagement with said interlock, and a lug on said first lever movable into engagement with said second lever when said first lever is moved to said other position to rock said second lever to shift said section into engagement with said interlock to move the latter out of locking relation with said winding mechanism independently of said shutter actuating mechanism.

9. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, of a camera back associated with said body and movable relative to said body to and from closed position, a lever pivoted on said body, a portion of said lever offset radially from the pivot of said lever and positioned in the path of and adapted to be engaged by said back when the latter is in body closing position to move said lever to one position, said back being movable out of engagement with said portion when said back is moved to open position to free said lever, means to shift said freed lever which now rocks about said pivot to move said lever to another position, a second lever pivoted on said body, a section on said lever movable into engagement with said interlock, a lug on said first lever movable into engagement with said second lever when said first lever is moved to said other position to rock said second lever to shift said section into engagement with said interlock to move the latter out of locking relation with said winding mechanism independently of said shutter actuating mechanism, and means to limit the movement of said second lever.

10. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism controlled by the film movement and operatively connected to said interlock for moving said interlock into engagement with said winding mechanism at the end of a film winding operation, of a back for said camera moveable relative to said body to and from camera closing position, means carried by said body and held in one position and out of engagement with said interlock when said back is in closed position, and means for moving said last mentioned means into engagement with said interlock when said back is opened to move said interlock out of locking relation with said film winding mechanism but without disengaging said interlock from said indexing mechanism to retain the phased relation of the latter.

11. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism controlled by the film movement and operatively connected to said interlock to permit the movement of said interlock into engagement with said winding mechanism at the end of a film winding operation, of a back for said camera movable relative to said body to and from camera closing position, a lever rockably mounted on said body and engaged and held in one position and out of operative relation with said interlock when said back is in closed position, and means for rocking said lever when said back is opened to move said lever into operative relation with said interlock to shift the latter out of locking relation with said winding mechanism independently of said shutter actuating mechanism but without disconnecting said interlock from said indexing mechanism to retain the phased relation of the latter.

12. In a roll film camera, the combination with a camera body, a film winding mechanism, a shutter actuation mechanism, an interlock positioned between said mechanisms and adapted normally to lock said mechanisms alternately so as to prevent a second actuation of the locked mechanism until the other mechanism has been operated, an indexing mechanism controlled by the film movement and operatively connected to said interlock to permit the movement of said interlock into engagement with said winding mechanism at the end of a film winding operation, of a back for said camera movable relative to said body to and from camera closing position, a lever rockably mounted on said body, a portion of said lever radially offset from the mounting of said lever and positioned in the path of and adapted to be engaged by said back when the latter is in closed position, means to retain said portion in positive engagement with said back when the latter is closed, the opening of said back serving to free said lever so that said means may move said lever to another position, a second lever rockably positioned on said body and having a section adapted to engage said interlock, and means on said first lever engaging and rocking said second lever to move said section into engagement with said interlock when said first lever moves to said other position so that said second lever will shift said interlock out of locking relation with said film winding mechanism independently of said shutter actuating mechanism but without disconnecting said interlock from said indexing mechanism to retain the phased relation of the latter.

13. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism controlled by the film movement and operatively connected to said interlock to permit the movement of said interlock into engagement with said winding mechanism at the end of a film winding operation, of a back for said camera movable relative to said body to and from camera closing position, a lever rockably mounted on said body, a portion of said lever radially offset from the mounting of said lever and positioned in the path of and adapted to be engaged by said back when the latter is in closed position, means to retain said portion in positive engagement with said back when the latter is closed, the opening of said back serving to free said lever so that said means may move said lever to another position, a second lever rockably positioned on said body and having a section adapted to engage said interlock, and means on said first lever engaging and rocking said second lever to move said section into engagement with said interlock when said first lever moves to said other position so that said second lever will shift said interlock out of locking relation with said film winding mechanism independently of said shutter actuating mechanism, and means on said indexing mechanism to limit the movement of said second lever to prevent the disconnection of said interlock from said indexing mechanism to retain the phased relation of the latter.

14. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism controlled by the film movement and operatively connected to said interlock to permit the movement of said interlock into engagement with said winding mechanism at the end of a film winding operation, of a back for said camera movable relative to said body to and from camera closing position, means carried by said body and held in one position and out of engagement with said interlock when said back is in closed position, means for moving said last mentioned means into engagement with said interlock when said back is opened to move said interlock out of locking relation with said film winding mechanism but without disengaging said interlock from said indexing mechanism to retain the phased relation of said interlock, and means independent of the second means for moving the first means into engagement with said interlock when said back is in closed position to shift said interlock out of locking relation with said film winding mechanism independently of said shutter actuating mechanism but without disconnecting said interlock from said indexing mechanism.

15. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism including a notched film measuring roll engaged and moved by the film, a pawl carried by said interlock and adapted to cooperate with said roll to permit said interlock to lock said winding mechanism after the film winding operation, of a camera back associated with said body and movable relative thereto to open and closed positions, a lever pivoted on said body adjacent said interlock, a depending portion on said lever positioned in the path of and adapted to be engaged by said back when the back is closed to rock said lever about its pivot to one position, said back being movable to open position to free said lever, spring means for rocking said lever about its pivot to another position, a second lever pivoted on said body independent of said interlock and adjacent said first lever, and means on said first lever adapted to engage and rock said second lever when said first lever is moved to said other position to shift said second lever about its pivot and into engagement with said interlock to move the latter out of locking relation with said winding mechanism independent of said shutter actuating mechanism.

16. In a roll film camera, the combination with a camera body, a film winding mechanism, a shutter actuating mechanism, an interlock positioned between said mechanisms and adapted normally to lock said mechanisms alternately so as to prevent a second actuation of the locked mechanism until the other mechanism has been operated, an indexing mechanism including a notched film measuring roll engaged and moved by the film, a pawl carried by said interlock and adapted to cooperate with said roll to permit said interlock to lock said winding mechanism after the film winding operation, of a camera back associated with said body and movable relative thereto to open and closed positions, a lever pivoted on said body adjacent but independent of said interlock, a depending portion on said lever positioned in the path of and adapted to be engaged by said back when the back is closed to rock said lever about its pivot to one position, said back being movable to open position to free said lever, spring means for rocking said lever about its pivot to another position, a second lever pivoted on said body independent of said interlock and adjacent said first lever, means on said first lever adapted to engage and rock said second lever when said first lever is moved to said other position to shift said second lever about its pivot and into engagement with said interlock to move the latter out of locking relation with said winding mechanism independent of said shutter actuating mechanism, and means associated with said measuring roll to limit the movement of said second lever so that said winding means will be unlocked without moving said pawl out of cooperating relation with said roll to maintain the phased relation of said indexing mechanism.

References Cited in the file of this patent

UNITED STATES PATENTS

| | | |
|---|---|---|
| 2,139,759 | Lindenberg | Dec. 13, 1938 |
| 2,301,956 | Kuppenbender | Nov. 17, 1942 |
| 2,559,880 | Kesel | July 10, 1951 |

FOREIGN PATENTS

| | | |
|---|---|---|
| 971,096 | France | June 28, 1950 |